US012739957B2

(12) United States Patent
Li

(10) Patent No.: US 12,739,957 B2
(45) Date of Patent: Sep. 15, 2026

(54) METHOD, DEVICE, SYSTEM AND STORAGE MEDIUM FOR CONTROLLING THE ORNAMENT LIGHTING

(71) Applicant: SHENZHEN HYSIRY TECHNOLOGY CO., LTD., Shenzhen (CN)

(72) Inventor: Ming Li, Shulan (CN)

( * ) Notice: Subject to any disclaimer, the term of this patent is extended or adjusted under 35 U.S.C. 154(b) by 309 days.

(21) Appl. No.: 18/470,430

(22) Filed: Sep. 20, 2023

(65) Prior Publication Data

US 2025/0056698 A1 Feb. 13, 2025

(30) Foreign Application Priority Data

Aug. 10, 2023 (CN) ......................... 202311005745.2

(51) Int. Cl.
*H05B 47/155* (2020.01)

(52) U.S. Cl.
CPC .................................. *H05B 47/155* (2020.01)

(58) Field of Classification Search
CPC ............................ H05B 47/155; H05B 47/165
See application file for complete search history.

(56) References Cited

U.S. PATENT DOCUMENTS

2010/0226617 A1* 9/2010 Piccionelli .............. G10L 15/22
345/2.1
2019/0274206 A1* 9/2019 Altamura ................ F21S 10/02
2021/0361105 A1* 11/2021 Piccionelli ........... H05B 47/155
2021/0400788 A1* 12/2021 Mekenkamp ........ H05B 47/175

* cited by examiner

*Primary Examiner* — Alexander H Taningco
*Assistant Examiner* — Pedro C Fernandez
(74) *Attorney, Agent, or Firm* — Sam Pierce

(57) ABSTRACT

Disclosed are a method, a device, a system and a medium for controlling the ornament lighting, and the method includes the following steps: connecting an ornament to obtain identification codes of the ornament; retrieving stored information about ornament scenes and light-emitting bodies according to the identification codes of the ornament; displaying the ornament scenes visually; selecting the light-emitting bodies of the ornament scenes for setting, and sending the setting information and the codes corresponding to the light-emitting bodies to the ornament; and having the ornament adjusted states of the corresponding light-emitting bodies according to the received setting information and codes.

8 Claims, 6 Drawing Sheets

METHOD, DEVICE, SYSTEM AND STORAGE MEDIUM FOR CONTROLLING THE ORNAMENT LIGHTING

TECHNICAL FIELD

The present disclosure belongs to the technical field of ornament lighting control, and relates to a method, a device, a system and a medium for controlling the ornament lighting.

BACKGROUND

Once being created and completed, a traditional ornament cannot be changed and adjusted in terms of content and color, which becomes great limitation for users who need to change the style of the ornament according to different environments and moods. Moreover, the traditional ornament is unable to realize dynamic display and interactive effects, thus being unable to meet needs of people in today's world for interactive experience.

SUMMARY

Aiming at defects in the prior art, the present disclosure provides a method, a device, a system and a medium for controlling the ornament lighting. Aiming at the diversity of the combination of ornament scenes content and the lighting, the ornament can be connected through smart devices to achieve more complex and precise control, improving the interaction between users and the ornament.

In order to achieve the above objective, the present disclosure adopts the following technical solution:

a method for controlling the ornament lighting, including the following steps:

connecting an ornament to obtain identification codes of the ornament;

retrieving stored information about ornament scenes and light-emitting bodies according to the identification codes of the ornament;

displaying the ornament scenes visually;

selecting the light-emitting bodies of the ornament scenes for setting, and sending the setting information and the codes corresponding to the light-emitting bodies to the ornament; and having the ornament adjusted states of the corresponding light-emitting bodies according to the received setting information and codes.

Further, prior to the step of "connecting an ornament to obtain identification codes of the ornament", there is a step "preparing a database", specifically including the following sub-steps:

inputting pictures of the ornament scenes, and setting a one-to-one identification code for different ornament scenes;

setting the information about light-emitting bodies in the ornament scenes;

presetting the lighting control drive program for the light-emitting bodies; and having the pictures of ornament scenes, identification code, information about light-emitting bodies and light-emitting drive program composed of a database.

Further, the information about light-emitting bodies includes the types of light-emitting bodies and codes for one-to-one correspondence of the light-emitting bodies in the ornament scenes.

Further, the Step "selecting the light-emitting bodies of the ornament scenes for setting, and sending the setting information and the codes corresponding to the light-emitting bodies to the ornament" includes the following sub-steps:

selecting the light-emitting bodies in the ornament scenes;

obtaining the specified type of the light-emitting body and having the corresponding attribute adjustment window popped up;

setting the light-emitting bodies in the attribute adjustment window; and sending the setting information to the ornament with the codes corresponding to the light-emitting bodies in real time when setting the light-emitting bodies.

Further, the attribute adjustment window includes light-emitting mode adjustment and/or color adjustment and/or brightness adjustment.

Further, the Step "selecting the light-emitting bodies of the ornament scenes for setting, and sending the setting information and the codes corresponding to the light-emitting bodies to the ornament" further includes the step of "storing the setting information", specifically including the following sub-steps:

exiting from the attribute adjustment window upon completion of the setting of light-emitting bodies; and acquiring and storing the setting information and codes of the light-emitting bodies to generate custom data.

Further, the visual display of the ornament scenes includes the display of the ornament content, the display of the light-emitting body layout, and the display of the real-time state of the light-emitting body.

Another embodiment of the present disclosure provides a device for controlling the ornament lighting, and the device includes:

an identification code acquisition module for connecting an ornament to acquire an identification code of the ornament;

an ornament scene retrieval module for retrieving stored information about ornament scenes and light-emitting bodies according to the identification codes of the ornament;

an ornament scene display module for visually displaying the ornament scenes;

a light-emitting setting module for selecting the light-emitting bodies of the ornament scenes for setting, and sending the setting information and the codes corresponding to the light-emitting bodies to the ornament; and an ornament control module for having the ornament adjusted the state of the corresponding light-emitting bodies according to the received setting information and codes.

Another embodiment of the present disclosure provides a system for controlling the ornament lighting, and the system includes at least a process; and a memory in communication connection with the at least one processor, where the memory stores an instruction executable by the at least one processor, and when the instructions are executed by the at least one processor, at least the one process is capable of executing the above method for controlling the ornament lighting.

Another embodiment of the present disclosure provides a non-volatile computer-readable storage medium, where the non-volatile computer-readable storage medium stores computer-executable instructions capable of being executed by the one or more processors, when the computer-executable instructions are executed by one or more processors, one or more processors are caused to perform the above method for controlling the ornament lighting.

Compared with the prior art, the technical solution of the present disclosure has the following advantages:

a painting or a decorative item with lighting effects is characterized by the combination of decorative content and light-emitting body effects, so as to achieve a richer and more beautiful static or dynamic display effect. The method visualizes information such as the ornament scenes and the layout of the light-emitting bodies by obtaining identification codes of a painting or a decorative item with lighting effects, and distinguishes different light-emitting bodies in the ornament scenes through the identification codes, and a single light-emitting body can be specified and set in combination with the content of the ornament scenes. Precise control and rich custom effects can be realized according to the user's aesthetic or mood, and in combination with various and complex decorations, and diversity of light-emitting body effects Moreover, the method features visual control, easy to operation, and has clear logic for specifying light-emitting bodies for separate control, being easy to understand.

Other features and advantages of the present disclosure will be set forth in the following specification, and will partially become apparent in the specification, or may be learned by implementing the present disclosure. Objectives and other advantages of the present disclosure may be realized and attained by the structure particularly pointed out in the written description and appended drawings.

BRIEF DESCRIPTION OF THE DRAWINGS

The present disclosure will be described in detail below in conjunction with the accompanying drawings, so as to make the advantages of the present disclosure clearer.

DETAILED DESCRIPTIONS OF THE EMBODIMENTS

For making the objectives and technical solutions of the present disclosure clearer, the present disclosure will be described in further detail below in conjunction with the accompanying drawings and embodiments. It should be understood that particular embodiments described herein are merely illustrative of the present disclosure and are not intended to limit the present disclosure.

Figure 1:
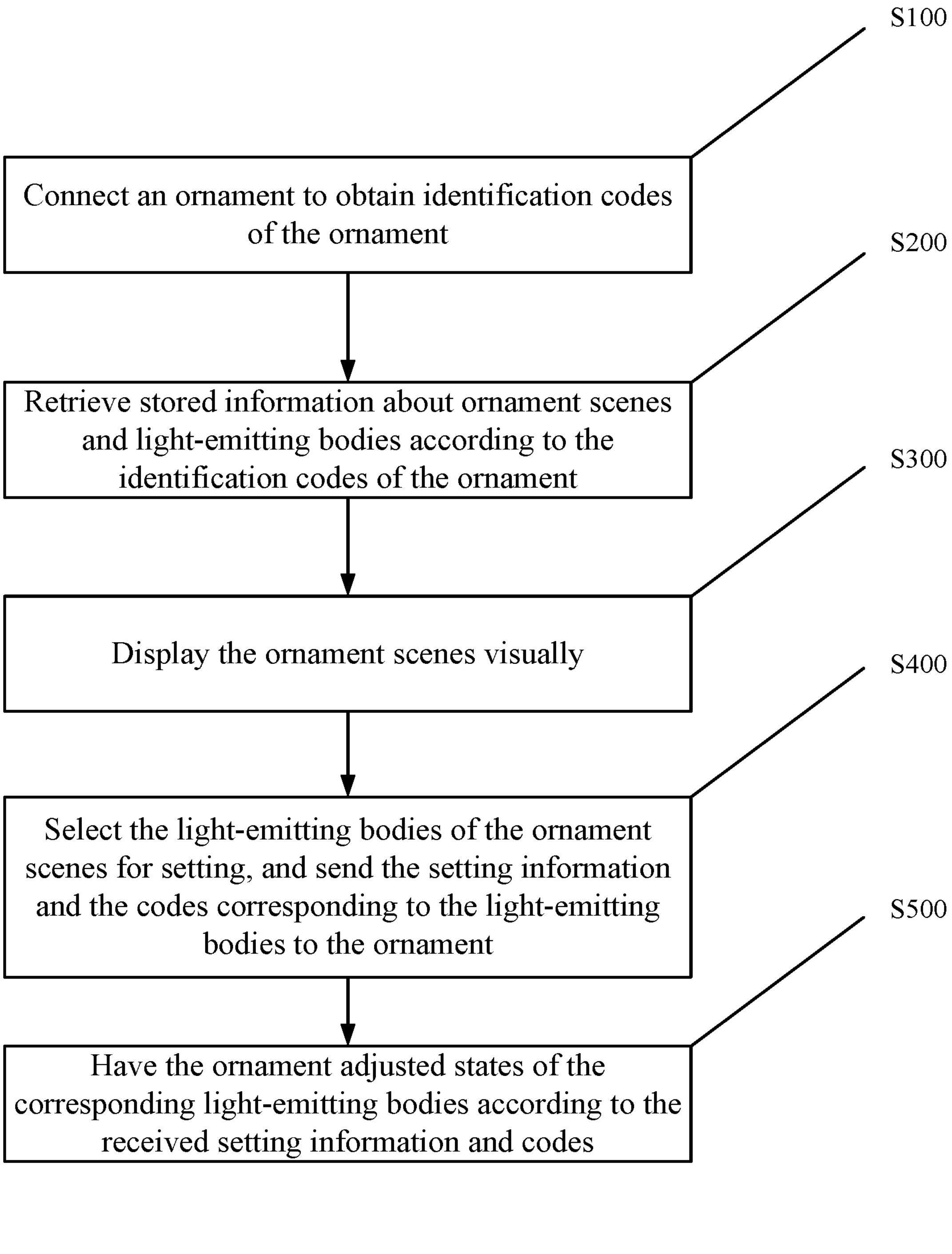
FIG. 1 is a flow chart of a method for controlling the ornament lighting in the present disclosure.

With reference to FIG. 1, a method for controlling the ornament lighting, including the following steps:

S100. connecting an ornament to obtain identification codes of the ornament;

a painting or a decorative item with lighting effects is characterized by the combination of decorative content and light-emitting body effects, so as to achieve a richer and more beautiful static or dynamic display effect. Therefore, control over light-emitting bodies of the ornament is complex. Before setting the light-emitting bodies of the ornament, it is necessary to obtain the identification codes of the ornament, such that the scene content of the ornament and the layout of the light-emitting bodies can be determined, which is a prerequisite for precise control and custom lighting drive.

S200. retrieving stored information about ornament scenes and light-emitting bodies according to the identification codes of the ornament;

relevant data is retrieved from the stored information according to the identification codes of the ornament, and the data is the information about the ornament scenes and the light-emitting bodies. The information about light-emitting bodies includes the types of light-emitting bodies and codes for one-to-one correspondence of the light-emitting bodies in the ornament scenes.

S300. displaying the ornament scenes visually;

Compared with a conventional infrared remote control method, the control method can realize visual display of the information about ornament scenes and light-emitting bodies, making the operation of a user more intuitive and convenient, such that the user can choose and set various parameters of the ornament in a more intuitive manner. The infrared remote control has a relatively simple operation mode, and the information feedback is not clear enough.

S400, selecting the light-emitting bodies of the ornament scenes for setting, and sending the setting information and the codes corresponding to the light-emitting bodies to the ornament;

the light-emitting bodies in the ornament scenes can be directly selected in the visual interface to make setting, which has a simple and clear operation logic, and strong interaction. The code of the specified light-emitting body is also read while the specified light-emitting body is selected. Codes are used to distinguish different light-emitting bodies in the ornament to achieve the purpose of precise control and custom setting. After the setting is completed, the setting information and the codes of the corresponding light-emitting bodies are sent to the ornament.

S500. having the ornament adjusted states of the corresponding light-emitting bodies according to the received setting information and codes.

A control circuit of the ornament adjusts the corresponding light-emitting body according to the received light-emitting body code and the setting information, featuring a clear information feedback.

An ornament includes a painting or a decorative item with lighting effects. For the painting with different scene contents, the light-emitting bodies can correspond to stars or the moon in the sky, or lights of buildings, or the light of sunrise/sunset or firelight of a closet, and the like.

For the decorative item with different scene content, the lighting content thereof varies with different three-dimensional shapes and scenes of different decorative items, and the light-emitting bodies can correspond to the indoor lighting, headlights of a car, street lights on the roadside, and even the lighting of various simulation models.

The scene contents of different light-emitting bodies vary with different themes of the painting or the decorative item of the ornament, therefore, when the lighting is adjusted, it is necessary to precisely adjust the light-emitting bodies at specific positions. Unified adjustment is prone to a sense of incongruity that the lighting effects do not match the scene content.

The existing lamps are subject to the infrared remote control, by which the preset drive program is generally input into a lamp, and the brightness, color and mode of the lamp are adjusted by remote control. This control method meets simple control of the lamp. However, for the painting or the decorative item with lighting effects, it is necessary to achieve custom settings and precise control of the light-emitting bodies, in which case, infrared control shows relatively obvious disadvantages. In order to achieve independent control of each light-emitting body, a control button is needed for each light-emitting body, which is likely to make the volume of controller cumbersome. Further, the corresponding relationship between the buttons on the controller and the light-emitting bodies in the ornament scenes is not obvious, the operation logic is complex and not intuitive. and it cannot meet the complex setting requirements in line with the light-emitting bodies and scene content.

For the control method in the present disclosure, the ornament is connected via smart devices such as smart phones, and tablets, so as to obtain the identification codes of the ornament, and the corresponding ornament scene and information about light-emitting bodies are accordingly obtained. Furthermore, by visual displaying the ornament scenes, the location and layout of the ornament scenes and the light-emitting bodies thereof the ornament can be seen in an intuitive manner. The light-emitting body to be adjusted can be selected directly in the visual interface, making the operation simple and clear. Codes are assigned to a plurality of light-emitting bodies in the ornament scenes, which shows a strong degree of freedom in lighting customization, but is not redundant in the operating interface. When receiving the control information, the control circuit of the ornament will also drive the specified light-emitting body to give a response and feedback according to the code.

Figure 2:
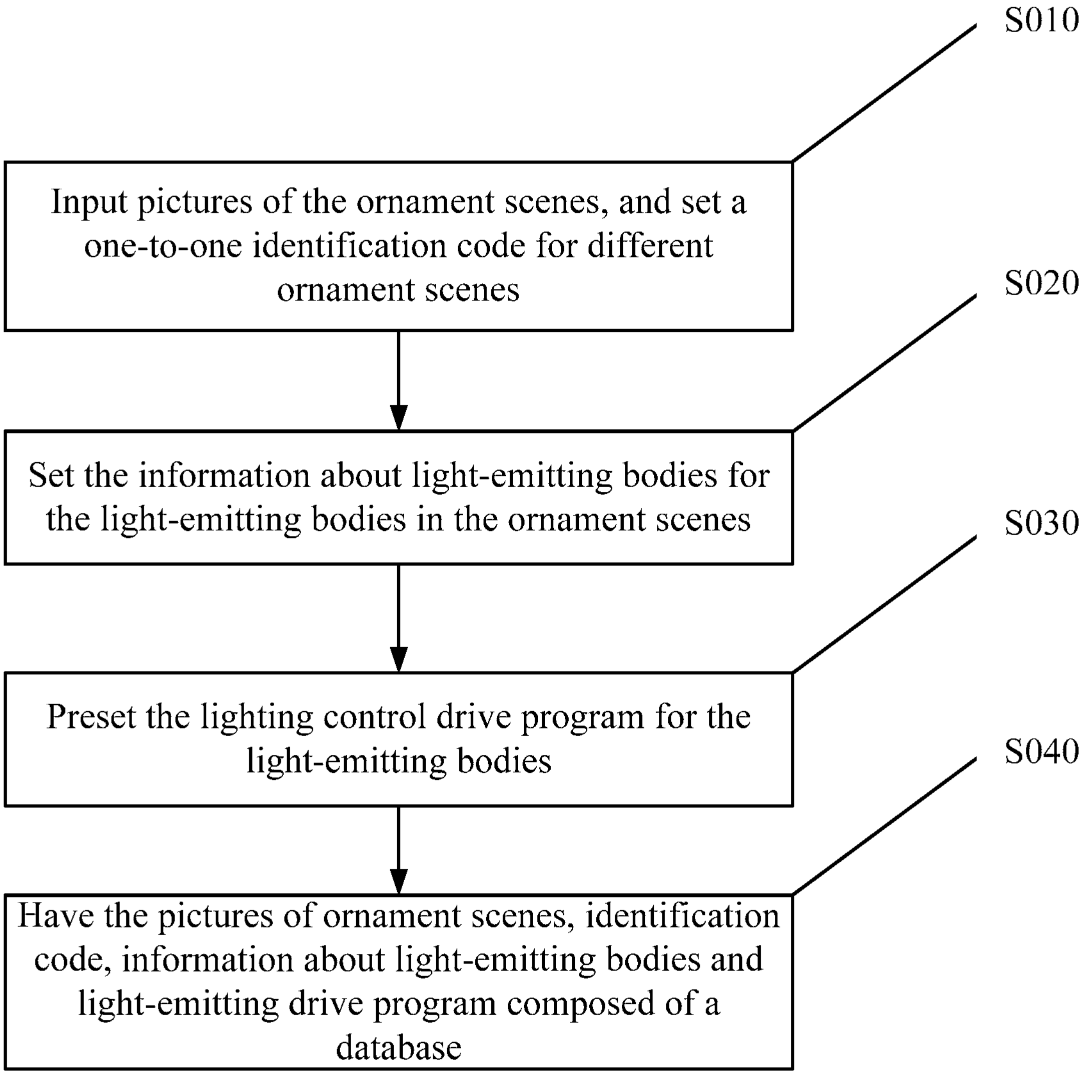
FIG. 2 is a flow chart for creating a database of a method for controlling the ornament lighting in the present disclosure.

With reference to FIG. 2, in the present embodiment, prior to the step of "connecting an ornament to obtain identification codes of the ornament", there is a step S000 "preparing a database", specifically including the following sub-steps:

S010. inputting pictures of the ornament scenes, and setting a one-to-one identification code for different ornament scenes; in order to improve the control efficiency, the accuracy and speed of data capture, identification codes are attached onto different ornament scenes and stored. After connecting with the ornament to obtain the identification code, the control device can quickly and accurately retrieve relevant data through the identification code.

S020. setting the information about light-emitting bodies for the light-emitting bodies in the ornament scenes; the setting information and the corresponding drive program vary with the light-emitting body when the light-emitting body is set. Therefore, it is necessary to make information remark on each light-emitting body in each ornament scene. The light-emitting bodies of the scenes are lamp beads and lamp strings.

S030. presetting the lighting control drive program for the light-emitting bodies; when a light-emitting body is a lamp bead, the corresponding settings include the frequency and rhythm, color and brightness of the flicker. When the light-emitting body is a lamp string, in addition to the brightness, color and flicker, the combination of different lamp beads on the lamp string can achieve a flowing effect. Therefore, when presetting the light-emitting drive program, it is necessary to consider types of light-emitting bodies.

S040. having the pictures of ornament scenes, identification code, information about light-emitting bodies and light-emitting drive program composed of a database. The database can be divided into two parts, of which the preset drive program corresponding to the ornament content can be located inside the ornament, and the control device can achieve control effects by switching the drive program executed. The information about all ornament scenes and light-emitting bodies of the ornament can be stored in the control device. When the control device is connected with the ornament, the identification codes of the ornament is obtained, and the data of the corresponding information about ornament scenes and light-emitting bodies is captured by the control device.

Through the establishment of the database, the universality of the control device can be realized, and no matter with what style of ornament the control device is connected, the corresponding data can be displayed in the control device by obtaining the identification codes of the ornament, so as to achieve the effect of remote control forever.

In the present embodiment, the visual display of the ornament scenes includes the display of the ornament content, the display of the light-emitting body layout, and the display of the real-time state of the light-emitting body. When the identification codes of the ornament is obtained, visualized information such as the ornament scenes, types of the light-emitting bodies, positions of the light-emitting bodies relative to the ornament scenes and colors of the light-emitting bodies can be displayed.

the control method can realize visual display of the information about ornament scenes and light-emitting bodies, making the operation of a user more intuitive and convenient, improving the user experience.

In the present embodiment, the information about light-emitting bodies includes the types of light-emitting bodies and codes for one-to-one correspondence of the light-emitting bodies in the ornament scenes. For different types of light-emitting bodies, the corresponding drive programs and options capable of being set are different. For example, compared with independent lamp beads, the lamp strings have control options, such as the common colors, flicker frequency, brightness adjustment, and a plurality of different drive programs can be preset for the lamp strings when the control is set, so that more adjustment options are available, such as flowing, interval flashing and other lighting effects.

Figure 3:
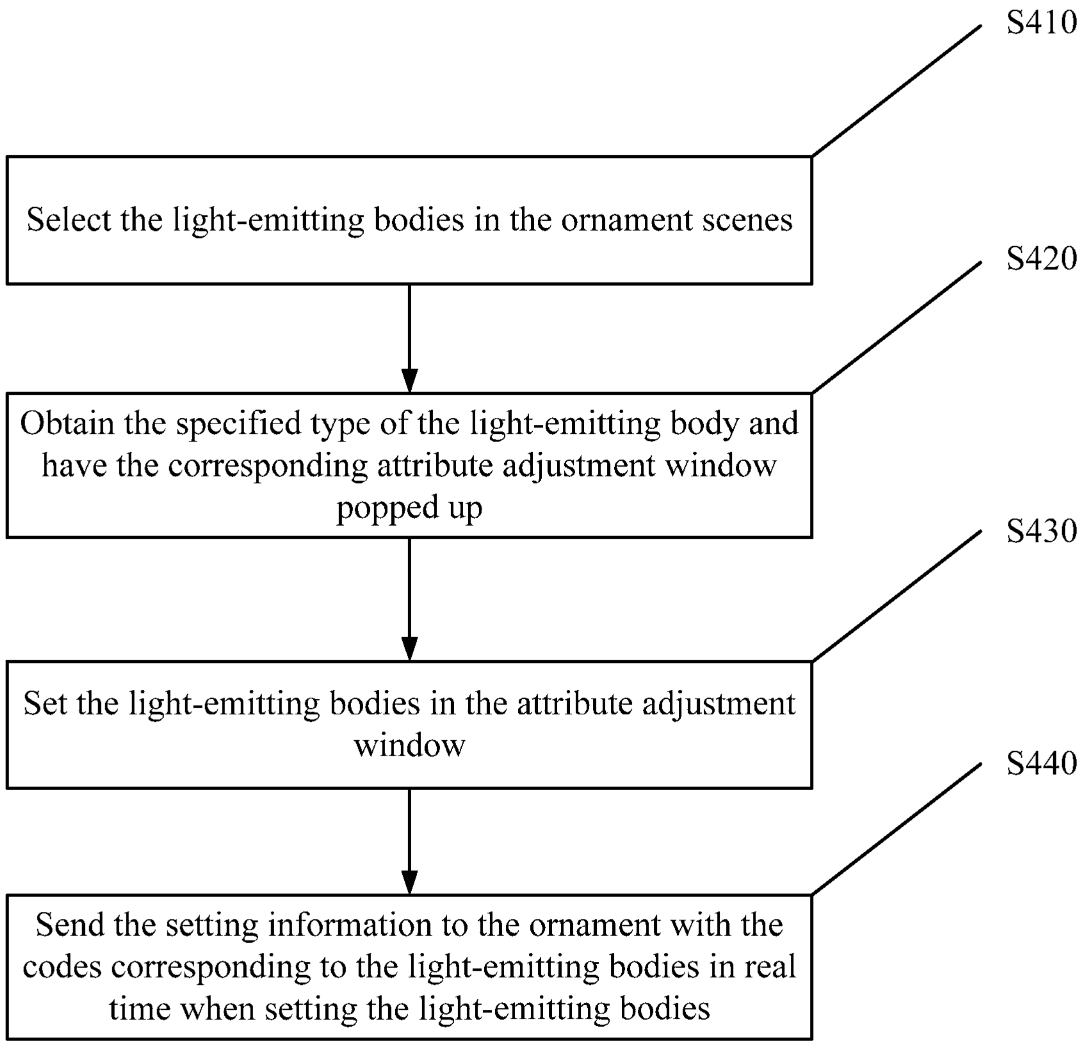
FIG. 3 is a flow chart for setting light-emitting bodies of a method for controlling the ornament lighting in the present disclosure.

With reference to FIG. 3, in the present embodiment, the "S400. selecting the light-emitting bodies of the ornament scenes for setting, and sending the setting information and the codes corresponding to the light-emitting bodies to the ornament" includes the following sub-steps:

S410. selecting the light-emitting bodies in the ornament scenes;

When the device such as smart phone or tablet is configured for controlling, the light-emitting body to be adjusted can be directly selected in the visual display interface, such that the specified light-emitting body is selected to enter the adjustment interface.

S420. obtaining the specified type of the light-emitting body and having the corresponding attribute adjustment window popped up; different types of light-emitting bodies correspond to different adjustment options. Lamp strings and other light-emitting bodies have more space for operation and adjustment than a single lamp bead, so there are more options for setting. Therefore, before the corresponding attribute adjustment window pops up, it is necessary to obtain the type of the light-emitting body, such that the corresponding attribute adjustment window pups up, so as to ensure the accuracy of setting adjustments.

S430. setting the light-emitting bodies in the attribute adjustment window;

the preset mode of the light-emitting bodies can be switched in the attribute adjustment window. At the same time, custom adjustments can be made to individually change the color or brightness of the specified light-emitting body or the operating mode, visual interface can provide rich operation options and visual operation, such that the user can choose and set various parameters of the ornament in a more intuitive manner. The infrared remote control has a relatively simple operation mode, and the information feedback is not clear enough.

S440. sending the setting information to the ornament with the codes corresponding to the light-emitting bodies in real time when setting the light-emitting bodies. In order to realize the real-time feedback of the corresponding light-emitting bodies in the ornament when setting is performed through the attribute adjustment window, the control device is required to capture the data of various setting indicators of the attribute adjustment window at a high frequency and send the same to the ornament, and to capture the data of various setting columns of the attribute adjustment window at a preset time frequency β and send the setting information and the codes of the corresponding light-emitting bodies to the ornament in real time, so as to achieve the purpose of real-time feedback of setting information from the ornament. In such a way, the efficiency of the interaction and feedback between the ornament and the user is improved, the delay is reduced, and the operating experience is optimized, thereby achieving the effects of stepless adjustment and dynamical adjustment of the pictures, and improving the viewing value and interactivity of the screen.

In the present embodiment, the attribute adjustment window includes light-emitting mode adjustment and/or color adjustment and/or brightness adjustment. The light-emitting mode adjustment involves the switching of preset drive program, such as the rhythm and frequency of flicker, the flickering match of the lamp beads on the lamp strings, or even the activation of the music rhythm mode.

Compared with the infrared remote control, the color adjustment has more options, and even the stepless color adjustment can be realized through the color palette, improving the selectivity of customized adjustment.

Brightness, mode and color adjustment, combined with the visual adjustment interface, can the light-emitting body to be adjusted in an intuitive and accurate manner by combining with the ornament scenes.

In the present embodiment, the step "selecting the light-emitting bodies of the ornament scenes for setting, and sending the setting information and the codes corresponding to the light-emitting bodies to the ornament" further includes Step 450 "storing the setting information", specifically including the following sub-steps:

acquiring and storing the setting information and codes of the light-emitting bodies to generate custom data; and exiting from the attribute adjustment window upon completion of the setting of light-emitting bodies.

In order to optimize the use experience of customers, a storing function should be provided for user-defined setting information of light-emitting bodies, to facilitate the one-click setting for the following user, reducing repetitiveness of setting adjustment, storing the setting information of users, providing personalized services and improving the user experience. However, how to distinguish which setting information is useful and which setting information is intermediate setting information discarded in the setting process, it shall be subject to the values selected for each adjustment in the attribute adjustment window when exiting the attribute adjustment window. On the one hand, it can automatically store the user-defined setting information, and on the other hand, it can automatically retain the setting information when exiting midway due to operational errors, greatly optimizing the user experience.

Figure 4:
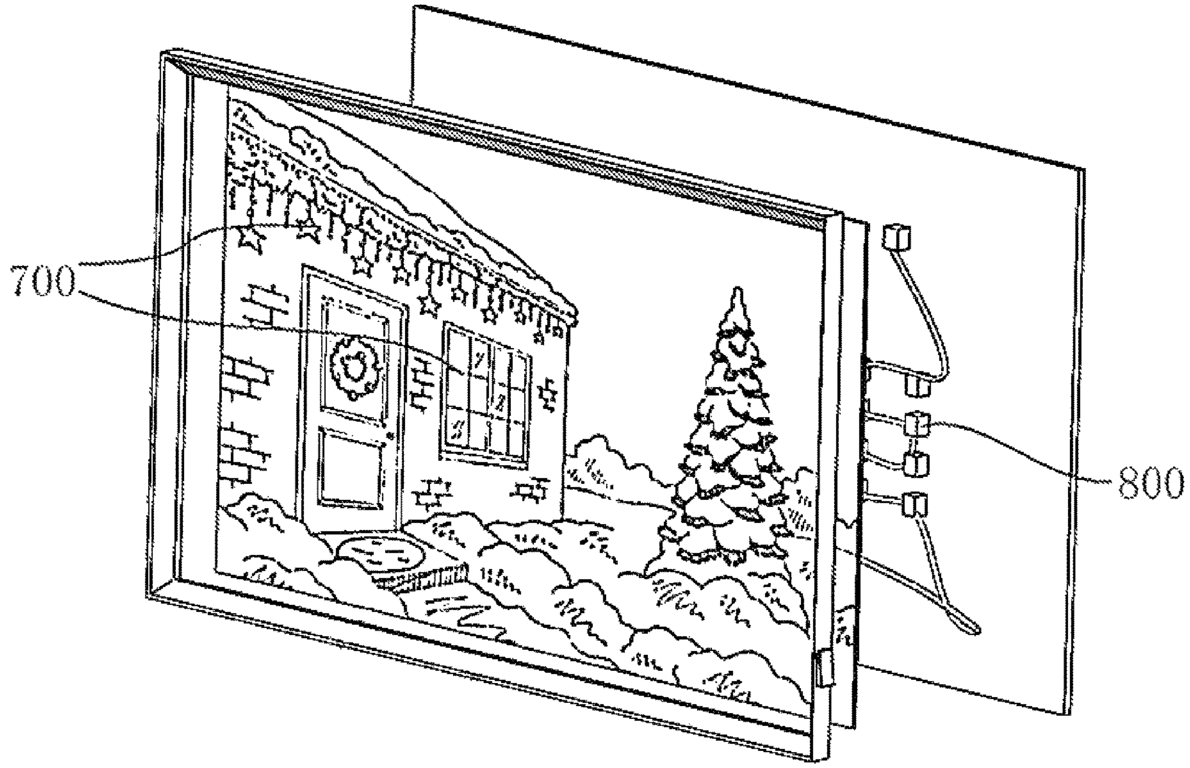
FIG. 4 is a schematic diagram of the application of a light-emitting painting of a method for controlling the ornament lighting in the present disclosure.

With reference to FIG. 4, in one embodiment, the ornament is a painting with lighting effects, including a fixing element and a canvas, where the fixing element is configured to fix the canvas, the front side of the canvas is printed with patterns, one or more light-emitting zones 700 are arranged on the front side of the canvas, and one or more light-emitting bodies 800 are arranged on the back side of the canvas;

positions of the light-emitting bodies 800 correspond to positions of the light-emitting zones 700, and the canvas is light-emitting material;

The light-emitting bodies 800 are connected to the control circuit, and control circuit is used to control the working state of the light-emitting bodies 800.

The number, position and size of the light-emitting zones 700 are arranged according to the patterns on the canvas, and the light-emitting zones 700 may be street lamps, windows at night, stars in the sky and lighting on the ground.

For example, when the pattern content is a street scene at night, the light-emitting zones 700 correspond to the moon, illuminated windows of buildings and starts in the sky of the pattern, and the light-emitting bodies 800 with different color temperatures and brightness can be selected on the back side of the canvas 200 according to the pattern content in the light-emitting zones 700.

The light-emitting painting is connected and the working state, such as constant lighting or flashing, of the light-emitting body 800 is controlled through an external device, that is, apart from static lighting effects, dynamic display effects can also be realized.

The control circuit is provided with a storage module for storing the light-emitting control program of the light-emitting bodies 800, and a plurality of light-emitting bodies 800 can be regulated by burning the control program in the storage module in advance, so as to achieve a better display effect of the painting.

Figure 5:
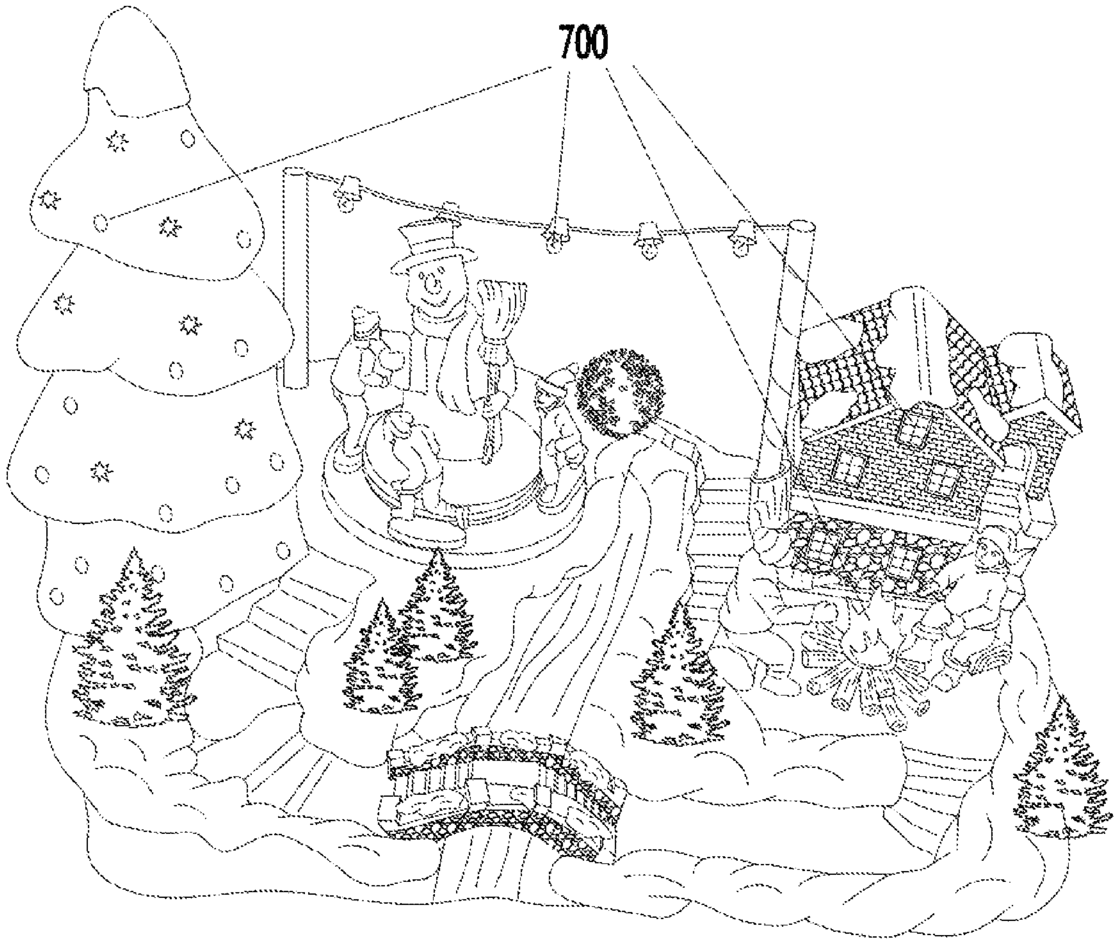
FIG. 5 is a schematic diagram of the application of a light-emitting decorative item of a method for controlling the ornament lighting in the present disclosure.

With reference to FIG. 5, in another embodiment, the ornament is a three-dimensional decorative item, including a three-dimensional model and a light-emitting body fixed on the surface of the model or embedded inside three-dimensional model, uniform light elements are arranged on the surface of the three-dimensional model, and the uniform light elements forms the light-emitting zones 700. When the contents of different three-dimensional models are different, and display effects of the light-emitting zones 700 are different, and working modes of the corresponding light-emitting bodies are also different. The light-emitting painting is connected and the working state, such as constant lighting or flashing, of the light-emitting body 800 is controlled through an external device, that is, apart from static lighting effects, dynamic display effects can also be realized.

Figure 6:
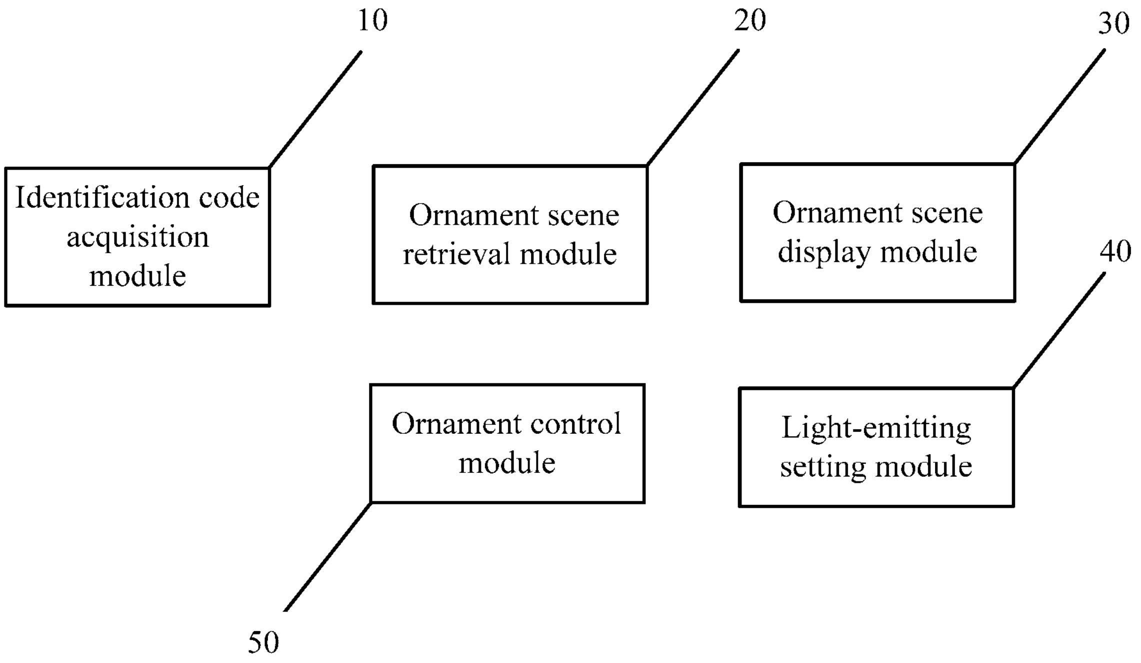
FIG. 6 is a schematic diagram of a functional module of an embodiment of a device for controlling the ornament lighting in the present disclosure.

With reference to FIG. 6, another embodiment of the present disclosure provides a device for controlling the ornament lighting, and the device includes:

- an identification code acquisition module 10 for connecting the ornament to acquire an identification code of the ornament; the connection and identification between the control device and the ornament are generally established through a Bluetooth unit. Before setting the light-emitting bodies of the ornament, it is necessary to obtain the identification codes of the ornament, such that the scene content of the ornament and the layout of the light-emitting body can be determined, which is a prerequisite for precise control and custom lighting drive;
- an ornament scene retrieval module 20 for retrieving the stored information about ornament scenes and light-emitting bodies according to the ornament identification code; and
- the information about ornament scenes and light-emitting bodies of all the ornaments may be stored in the control device. When the control device is connected with the ornament, the identification codes of the ornament is obtained, and the data of the corresponding information about ornament scenes and light-emitting bodies is captured by the control device;
- an ornament scene display module 30 for visually displaying the ornament scenes;
- the touch screen of the control device is generally used to visually display the ornament scenes, which is convenient to display and easy to operation;
- a light-emitting setting module 40 for selecting the light-emitting bodies of the ornament scenes for setting, and sending the setting information and the codes corresponding to the light-emitting bodies to the ornament; and
- an ornament control module 50 for having the ornament adjusted the state of the corresponding light-emitting bodies according to the received setting information and codes.

Through the identification code acquisition module and the ornament scene retrieval module, the user can retrieve the information about different ornament scenes and light-emitting bodies according to his/her own needs to achieve personalized settings. Through the ornament scene display module, the user can see the real-time scenes of the ornament and the state of the light-emitting bodies in an intuitive manner, making the operation more intuitive and convenient. Through the light-emitting body setting module, the user can set each light-emitting body in the ornament scenes independently to realize precise control. Through the ornament control module, the ornament can adjust the state of the light-emitting bodies in real time according to the received setting information and codes, so that the user's operation can get timely feedback. All operations can be completed on a single control device, and the user does not need to make physical operation of the ornament, making the operation simple and convenient. The information about all ornament scenes and light-emitting bodies can be stored in the control device for easy management and retrieval. The design of the above modules is reason, and new functional modules, such as a voice control module, a gesture control module, and the like, can be added as needed, so as to enhance the functionality and interest of the system.

Figure 7:
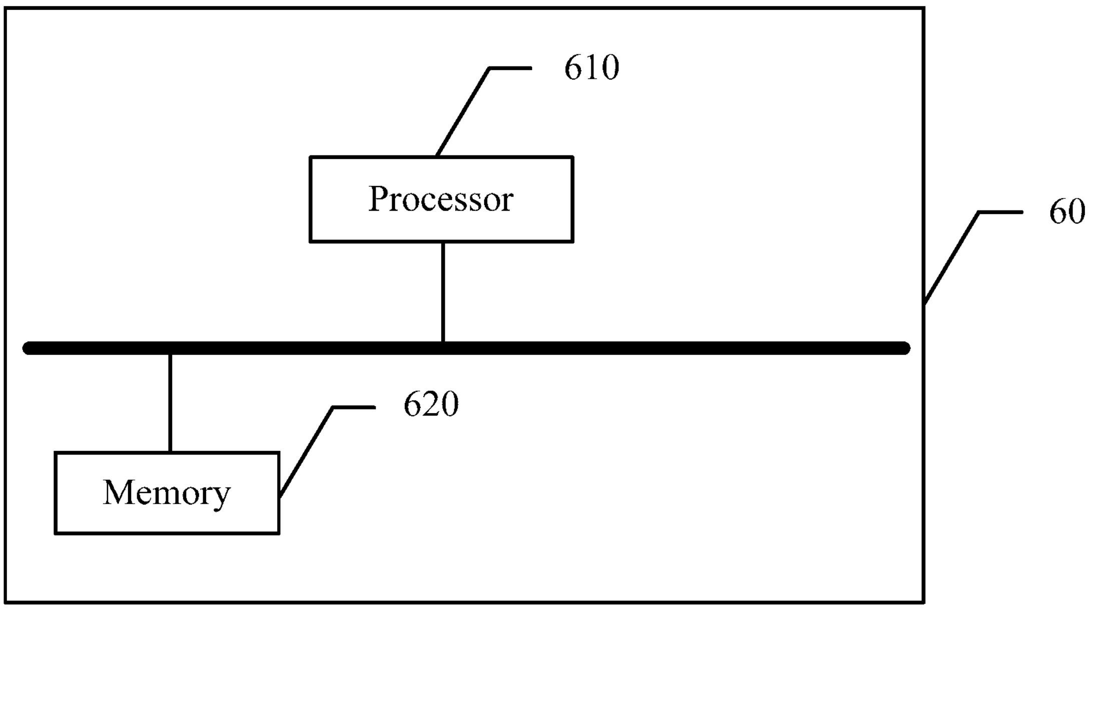
FIG. 7 is a structure schematic diagram of hardware of an embodiment of a system for controlling the ornament lighting in the present disclosure.

Another embodiment of the present disclosure provides a system for controlling the ornament lighting, as shown in FIG. 7, the system 60 includes:

- one or more processors 610 and a memory 620, one processor 610 is taken as an example for introduction in FIG. 5, the processor 610 and the memory 620 may be connected through a bus or in other ways, and the connection through a bus is taken as an example for introduction in FIG. 5.

The processor 610 is configured to complete various control logics of the system 60, it may be a general-purpose processor, a digital signal processor (DSP), an application-specific integrated circuit (ASIC), a field-programmable gate array (FPGA), a single-chip microcomputer, an Acorn RISC Machine (ARM) or other programmable logic devices, discrete gates or transistorized logic, discrete hardware components, or any combination these parts. Further, the processor 610 may be any conventional processor, microprocessor, or state machine. The processor 610 may also be implemented as a combination of computing devices, such as a combination of a DSP and a microprocessor, a plurality of microprocessors, one or more microprocessors combined with a DSP, and/or any other such configuration.

As a non-volatile computer-readable storage medium, the memory 620 can be configured to store non-volatile software programs, non-volatile computer-executable programs, and modules, such as program instructions corresponding to the method of controlling the ornament lighting in an embodiment of the present disclosure. By running the non-volatile software programs, instructions, and modules stored in the memory 620, the processor 610 executes various functional applications of the system 60 and data processing, that is, implementing the method of controlling the ornament lighting in the above method embodiment.

The memory 620 may include a storage program area and a storage data area, where the storage program area may store an operating system, and an application program required for at least one function; and the storage data area may store data created according to the use of the system 60, and the like. Further, the memory 620 may include a high-speed random access memory, and may also include a non-volatile memory, such as at least one magnetic disk memory device, flash memory device, or other non-volatile solid state memory devices. In some embodiments, the memory 620 may optionally include memory located remotely located from the processor 610, and these remote memories may be connected to the system 60 via a network. Examples of the above networks include but are not limited to the Internet, an enterprise intranets, local area networks, mobile communications networks, and combinations thereof.

One or more units are stored in the memory 620. When they are executed by the one or more processors 610, the method of controlling the ornament lighting in any of the above method embodiments are performed, such as performing the steps S100-S500 of the method in FIG. 1 described above.

An embodiment of the present disclosure provides a non-volatile computer-readable storage medium, the computer-readable storage medium stores computer-executable instructions capable of being executed by the one or more processors, such as performing the steps S100-S500 of the method in FIG. 1 described above.

As an example, the non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) acting as an external cache memory. By way of illustration but not restriction, RAM is available in many forms such as synchronous RAM (SRAM), dynamic RAM, (DRAM), synchronous DRAM (SDRAM), double data rate SDRAM (DDRSDRAM), enhanced SDRAM (ESDRAM), Synchlink DRAM (SLDRAM), and direct Rambus RAM (DRRAM). The disclosed memory components or memory of the operating environment described herein are intended to include one or more of these and/or any other suitable types of memory. Another embodiment of the present disclosure provides a computer program product, the computer program product includes a computer program stored on the non-volatile computer-readable storage medium, the computer program includes program instructions, and when the program instructions are executed by a processor, causing the processor to perform a method of controlling the ornament lighting in the above method embodiment, such as performing the steps S100-S500 of the method in FIG. 1 described above.

To sum up, the present disclosure discloses a method, a device, a system and a medium for controlling the ornament lighting, and the method visualizes information such as the ornament scenes and the layout of the light-emitting bodies by obtaining identification codes of a painting or a decorative item with lighting effects, and distinguishes different light-emitting bodies in the ornament scenes through the identification codes, and a single light-emitting body can be specified and set in combination with the content of the ornament scenes. Precise control and rich custom effects can be realized according to the user's aesthetic or mood, and in combination with various and complex decorations, and diversity of light-emitting body effects Moreover, the method features visual control, easy to operation, and has clear logic for specifying light-emitting bodies for separate control, being easy to understand.

The embodiments described above are merely schematic, where units described as separate components may or may not be physically separated, and a component displayed as a unit may or may not be a physical unit, that is, the component may be located at one place, or distributed on a plurality of network units. Part or all of the modules may be selected according to actual requirements to achieve the objective of the solution of the embodiments.

From the description of the above embodiments, it may be apparent to those skilled in the art that each embodiment may be achieved by means of software plus a general-purpose hardware platform, and certainly may also be achieved by means of hardware. On the basis of the understanding, the technical solution mentioned above may be embodied in a form of a software product in essence or a part contributing to the prior art, and the computer software product can be stored in a computer readable storage medium (for example, a ROM/RAM, a diskette, an optical disk, and the like), and includes a plurality of instructions for enabling a computer device (like a personal computer, a server or a network electronic device, and the like) to execute the method described in various embodiments or some parts of the embodiments.

Conditional terms such as "can", "could", "may" or "might", and among others, are generally intended to convey that a particular embodiment can include (while other embodiments do not include) particular features, elements, and/or operations, unless otherwise specifically stated or otherwise understood within the context as used. Therefore, these conditional terms are generally also intended to imply that features, elements, and/or operations are anyway required for one or more embodiments, or that one or more embodiments must include logic to determine whether such features, elements, and/or operations are included or would be performed in any particular embodiment with or without any input or prompt.

What has been described herein in the description and drawings includes examples capable of providing a method, a device, a system and a medium for controlling the ornament lighting. Of course, not every conceivable combination of elements and/or methods has been described for purposes of describing various features of the present disclosure, but it can be appreciated that many further combinations and permutations of the disclosed features are possible. Therefore, it will be apparent that various modifications can be made to the present disclosure without departing from the scope or spirit of the present disclosure. Furthermore, or in the alternative, other embodiments of the present disclosure may be apparent from consideration of the description and drawings, and from practice of the present disclosure as presented herein. It is intended that the examples set forth in the description and drawings will be considered in all respects as illustrative and not restrictive. Although specific terms are used herein, they are used in a generic and descriptive sense only and not for purposes of restriction.

What is claimed is:

1. A method for controlling an ornament lighting, comprising the following steps:

connecting an ornament to obtain an identification code of the ornament, the ornament comprises a painting or a decorative item with lighting effects;

retrieving stored information about ornament scenes and light-emitting bodies according to the identification code of the ornament;

displaying the ornament scenes visually, comprising: displaying ornament content, displaying a layout of the light-emitting bodies, and display a real-time state of the light-emitting bodies;

in an visual interface, selecting the light-emitting bodies of the ornament scenes for setting, and sending the setting information and codes corresponding to the light-emitting bodies to the ornament; wherein the information about light-emitting bodies comprises the types of light-emitting bodies and codes for one-to-one correspondence of the light-emitting bodies in the ornament scenes; and having the ornament adjusted the state of the corresponding light-emitting bodies according to the received setting information and the codes, the states of the corresponding light-emitting bodies comprise constant lighting or flashing, so as to achieve a static lighting effect and a dynamic display effect.

2. The method for controlling the ornament lighting according to claim 1, wherein there is a step "preparing a database" prior to the step of "connecting an ornament to obtain an identification code of the ornament", specifically comprising the following sub-steps:

inputting pictures of the ornament scenes, and setting a one-to-one identification code for different ornament scenes;

setting the information about light-emitting bodies in the ornament scenes;

presetting the lighting control drive program for the light-emitting bodies; and having the pictures of ornament scenes, identification code, information about light-emitting bodies and light-emitting drive program composed of a database.

3. The method for controlling the ornament lighting according to claim 1, wherein the Step "selecting the light-emitting bodies of the ornament scenes for setting, and sending the setting information and the codes corresponding to the light-emitting bodies to the ornament" comprises the following sub-steps:

selecting the light-emitting bodies in the ornament scenes;

obtaining the specified type of the light-emitting body and having the corresponding attribute adjustment window popped up;

setting the light-emitting bodies in the attribute adjustment window; and capturing the data of various setting columns of the attribute adjustment window at a preset time frequency β when setting the light-emitting bodies, and send the setting information and the codes of the corresponding light-emitting bodies to the ornament in real time.

4. The method for controlling the ornament lighting according to claim 3, wherein the attribute adjustment window comprises at least one of a light-emitting mode adjustment, a color adjustment, and a brightness adjustment.

5. The method for controlling the ornament lighting according to claim 3, wherein the Step "selecting the light-emitting bodies of the ornament scenes for setting, and sending the setting information and the codes corresponding to the light-emitting bodies to the ornament" further comprises the step of "storing the setting information", specifically comprising the following sub-steps:

exiting from the attribute adjustment window upon completion of the setting of light-emitting bodies; and acquiring and storing the setting information and codes of the light-emitting bodies to generate custom data.

6. A system for controlling the ornament lighting, comprising at least a process; and a memory in communication connection with the at least one processor, wherein the memory stores an instruction executable by the at least one processor, and when the instructions are executed by the at least one processor, at least the one process is capable of executing the above method for controlling the ornament lighting according to claim 1.

7. A storage medium for controlling decorative lighting, wherein the storage medium for controlling decorative lighting stores computer-executable instructions capable of being executed by the one or more processors, when the computer-executable instructions are executed by one or more processors, one or more processors are caused to perform the above method for controlling the ornament lighting according to claim 1.

8. A device for controlling an ornament lighting, comprising:

an identification code acquisition module for connecting an ornament to acquire an identification code of the ornament, the ornament comprises a painting or a decorative item with lighting effects;

an ornament scene retrieval module for retrieving stored information about ornament scenes and light-emitting bodies according to the identification code of the ornament;

an ornament scene display module for visually displaying the ornament scenes, comprising: displaying ornament content, displaying a layout of the light-emitting bodies, and display a real-time state of the light-emitting bodies;

a light-emitting setting module for selecting the light-emitting bodies of the ornament scenes for setting in an visual interface, and sending the setting information and codes corresponding to the light-emitting bodies to the ornament; wherein the information about light-emitting bodies comprises the types of light-emitting bodies and codes for one-to-one correspondence of the light-emitting bodies in the ornament scenes; and an ornament control module for having the ornament adjusted the state of the corresponding light-emitting bodies according to the received setting information and the codes.

* * * * *